Oct. 6, 1931.  E. G. RIDER  1,826,287
BOX WRAPPING MECHANISM
Filed Sept. 22, 1927  6 Sheets-Sheet 1

Fig.1.

INVENTOR.
Ernest G. Rider
BY
Cornelius L. E. Pret
his ATTORNEY.

Oct. 6, 1931.  E. G. RIDER  1,826,287
BOX WRAPPING MECHANISM
Filed Sept. 22, 1927  6 Sheets-Sheet 2

INVENTOR.
Ernest G. Rider
BY Cornelius D. Ehret
ATTORNEY.

Oct. 6, 1931.  E. G. RIDER  1,826,287

BOX WRAPPING MECHANISM

Filed Sept. 22, 1927  6 Sheets-Sheet 3

INVENTOR.
Ernest G. Rider
BY Cornelius L. Ebret
his ATTORNEY.

Oct. 6, 1931.  E. G. RIDER  1,826,287
BOX WRAPPING MECHANISM
Filed Sept. 22, 1927   6 Sheets-Sheet 6

INVENTOR.
Ernest G. Rider
BY Cornelius D. Ehret
ATTORNEY.

Patented Oct. 6, 1931

1,826,287

UNITED STATES PATENT OFFICE

ERNEST G. RIDER, OF PHILADELPHIA, PENNSYLVANIA, ASSIGNOR TO STOKES AND SMITH COMPANY, OF PHILADELPHIA, PENNSYLVANIA, A CORPORATION OF PENNSYLVANIA

BOX WRAPPING MECHANISM

Application filed September 22, 1927. Serial No. 221,202.

My invention relates to a method of and apparatus for applying a wrapper, sheet, label, or the like, either tabbed or untabbed, hereinafter generically termed a "wrapper", to a box, either stayed, or unstayed, box cover, package, container structure, or the like, hereinafter generically termed a "box".

In accordance with my invention, during movement of a box and a wrapper along a predetermined path, a section of the wrapper is folded into engagement with a box wall by a tool or other instrumentality co-acting with the wrapper portion while moving, and having a component of motion in the direction of movement of the box and wrapper; and more particularly, a box with a wrapper adhering to its bottom is passed along a predetermined path by the form block structure of a wrapping machine or the like, and during movement of the box as effected by the form block structure aforesaid, a wrapper section, particularly a corner lap section, is folded into engagement therewith by a tool operating in timed relation to said form block structure, particularly by cam or equivalent actuation, and having a component of motion in the direction of movement of the box and wrapper.

Further in accordance with my invention, during movement of a box and a wrapper along a predetermined path, a section of a wrapper portion is folded into engagement with a box wall by a tool which at the conclusion of the folding operation wipes the folded section into more intimate engagement with the box wall; more particularly, the tool, at termination of the folding operation, remains stationary and by its shape effects closer contact between the folded section and the box wall as they move relatively thereto; still more particularly, the tool is actuated by a cam operating in timed relation to the form block structure of a wrapping machine which moves the box along said path.

Further in accordance with my invention, in the application of a wrapper to a box, a wrapper portion is folded into engagement with a box wall, particularly a side wall, and before said operation is completed, or immediately thereafter, certain regions of said portion, particularly regions adjacent the ends of said wall, are wiped or pressed into more intimate engagement therewith.

Further in accordance with my invention, in the application of a wrapper to a box, a wrapper portion is folded into engagement with a wall of a box, and substantially immediately thereafter a section of the wrapper portion is folded into engagement with an adjacent wall and simultaneously therewith regions of the wrapper portion adjacent the ends of the first wall are wiped into more intimate engagement therewith.

Further in accordance with my invention, in the application of a wrapper to a box, while a section of a wrapper portion is being folded into engagement with a box wall, more particularly an end wall, another section of the same portion is being wiped into intimate engagement with another wall of a box, more particularly, a side wall adjacent said end wall. More specifically, during movement of a box and a wrapper along a predetermined path by the form block structure of a wrapping machine, tools operating in timed relation to said form block, and preferably actuated by cam or equivalent mechanism, fold a section of a wrapper portion into engagement with a box wall and, simultaneously therewith, wipe another section of the portion into intimate engagement with another box wall. Further, if the box is unstayed, certain of the tools maintain the box wall in engagement with the form block during the operations above described.

Further in accordance with my invention, there are provided slides, units or slide units adjustable upon slides or guides to different positions with respect to the work-carrying structure to accommodate boxes of various sizes, each slide, unit or slide unit comprising a novel type of tool or element, particularly one actuated by a cam in timed relation to the form block of a wrapping machine, for folding a wrapper section into engagement with a box wall during simultaneous movement of the box and tool or element.

Further in accordance with my invention, there is provided novel structure embodying corner lap fingers for applying to the ends of the box the extensions on the side panels of the wrapper, which, preferably, cooperate with wiping fingers for pressing the side panels of the wrapper into intimate engagement with the sides of the box.

My invention resides in the method, apparatus, structures, and details of construction of the character hereinafter described and claimed.

This application is in part a continuation of my co-pending application Serial No. 99,759, filed April 5. 1926.

For an illustration of some of the various forms my invention may take, reference is to be had to the accompanying drawings, in which.

Hithertofore in the box covering art, to produce a satisfactorily wrapped box, the corner lap sections of a wrapper have been folded into engagement with the box ends only during a pause in the downward passage of the box as controlled or effected by the form block structure of a wrapping machine. When it was attempted to effect this operation during travel of the box, as by movement of a tool which reciprocated transversely of the path of travel, mutilation of the wrapper, or a poorly wrapped box resulted. It is characteristic of my invention, that such corner lap sections are folded into adhering engagement with the box ends without necessitating pause in the movement of the box by a tool having a component of motion in the direction of travel of the box and wrapper, thereby effecting a material saving in the time consumed for a box wrapping operation without sacrificing quality of the finished product.

In accordance with my invention, mechanism of any suitable type may be utilized for applying wrappers to boxes, preferably a wrapping machine broadly of the type disclosed in U. S. Letters Patent to Smith, No. 691,329, and more specifically of the character disclosed in U. S. Letters Patent to Federwitz and Bailey, No. 1,541,036, and still more specifically of the type disclosed in U. S. Letters Patent to Nitsch and Federwitz, No. 1,540,900.

In the example shown, the wrapping machine is of the character disclosed in the aforesaid Nitsch and Federwitz patent, No. 1,540,900, suitably modified in accordance with my invention.

Figure 1:
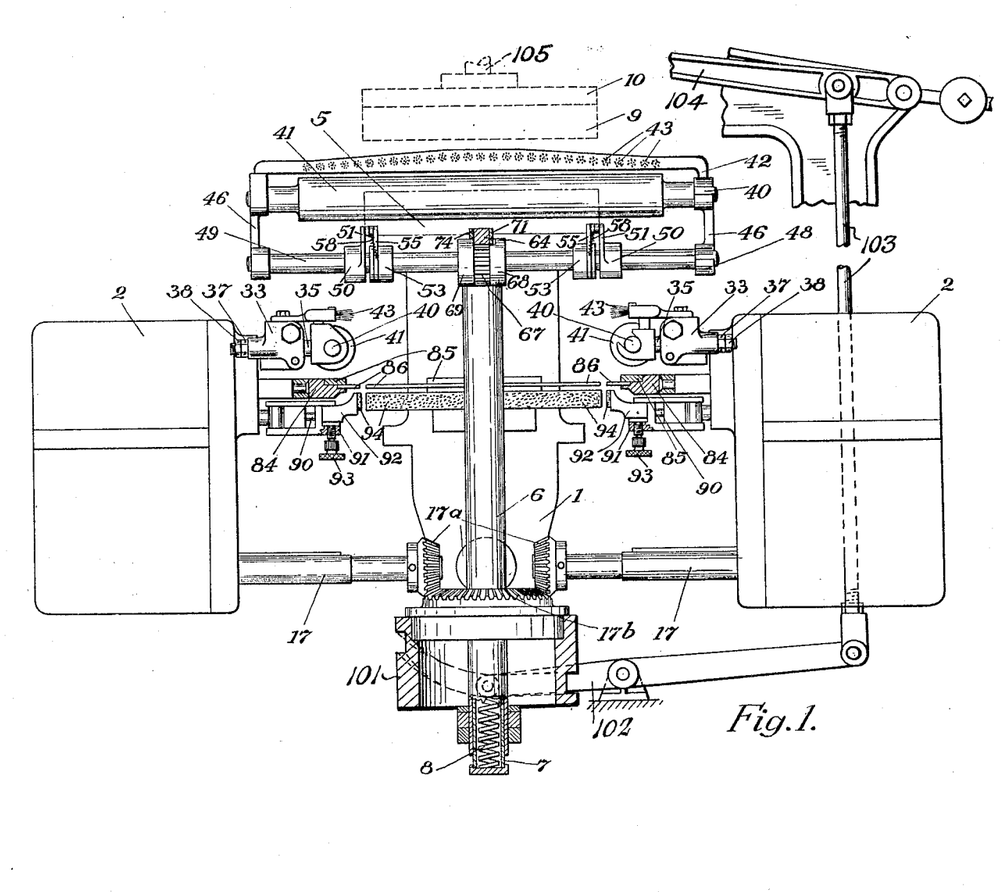
Fig. 1 is a side elevational view, partly in section, of apparatus constructed in accordance with my invention.
Figures 2, 7, 8:
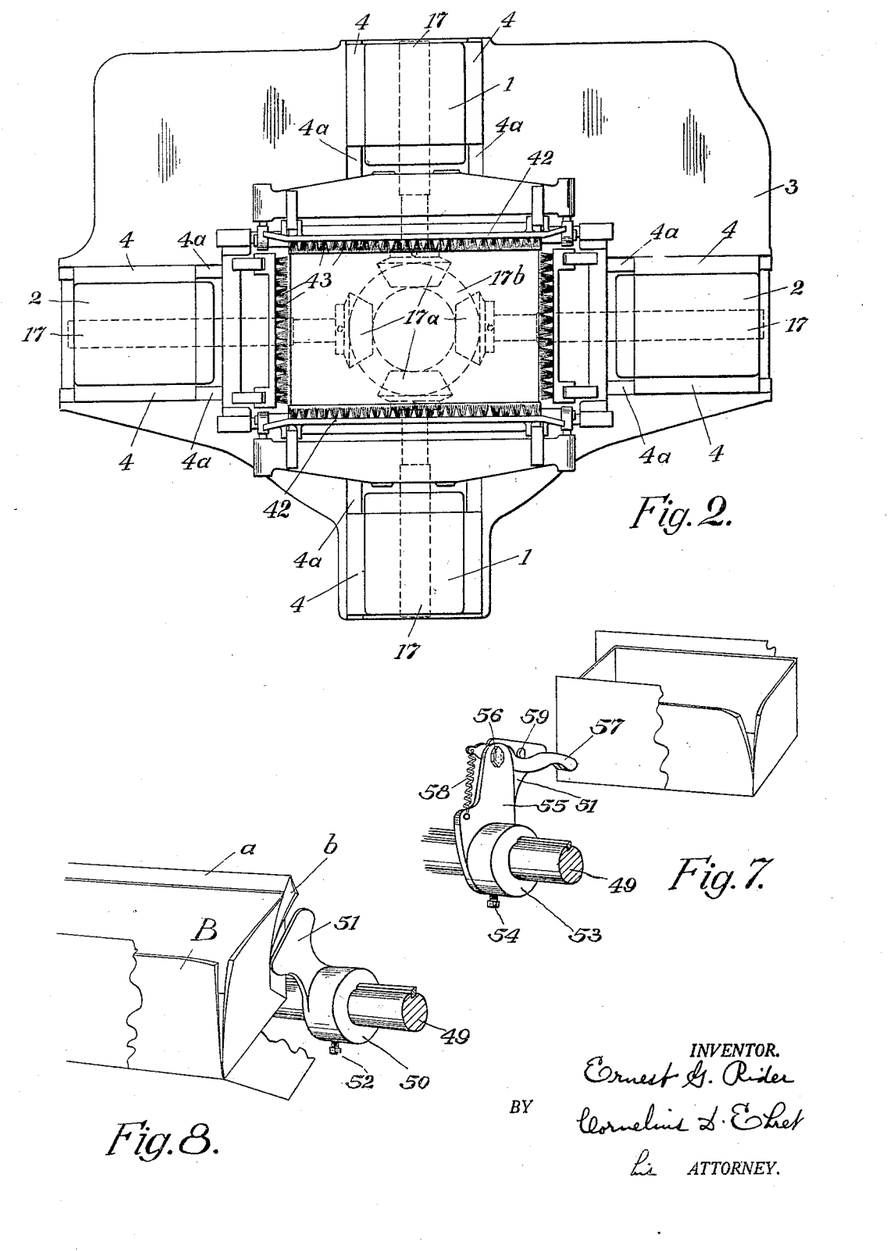
Fig. 2 is a plan view of an assembly of the four slides or slide units for applying a wrapper to the sides and ends of a box.
Fig. 7 is a perspective view showing a corner lap folding tool, and a finger of a holding tool associated therewith, supporting the side wall of an unstayed box.
Fig. 8 is a perspective view showing a corner lap folding tool while applying the corner lap section to the end wall of an unstayed box.

Referring to Figs. 1 and 2, there is shown an assembly of the slides, or slide units, 1 and 2, the units, 1, 1 being disposed opposite each other in cooperative relation with the sides of the box B, and the units or slides 2, 2 being disposed opposite each other and in cooperative relation with the ends of the box B.

The units 1 and 2 are mounted upon any suitable support, as the base or table 3, provided with slide or guide ways 4a upon which rest and slide the laterally projecting members 4 upon the units 1 and 2, which are slidably adjustable toward or away from the center of the structure or machine for accommodation of boxes of different sizes and proportions as regards length of sides and ends. Any suitable means, not shown, are provided for clamping the units to the base or table 3 in the adjusted or predetermined positions.

The units 1 and 2 are grouped around the platen 5 upon which the box and its cover blank engage, the platen being supported by a vertical column or plunger 6 movable vertically on the hollow support 7, in which is disposed a spring 8 opposing downward movement of the platen 5 and restoring it to the normal position indicated in Fig. 1 upon completion of a cycle of operation. Disposed above the platen 5 is the form block or form plunger comprising the main form block 9 and the separate supplementary or upper form block 10, the members 9 and 10 partaking of vertical movements in unison with and independently of each other, such movements having extents determined and timed by any suitable structure, as, for example, by cam structure, such as, for example, mechanism A of the aforesaid Letters Patent No. 691,329, or any equivalent structure, the members 9 and 10 corresponding, respectively, with the members 49 and 50 of said Letters Patent.

Figure 3:
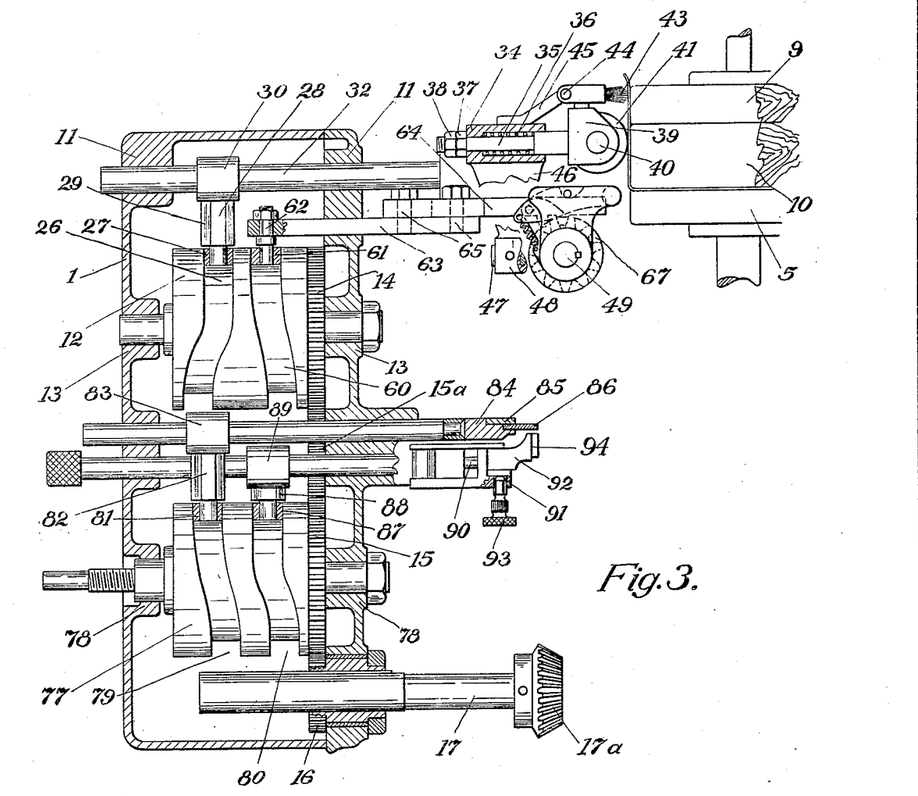
Fig. 3 is a vertical sectional view, partly in elevation, of one of the slides or units provided with a corner lap folding tool and a cooperating wiping tool constructed in accordance with my invention.

Referring to Fig. 3, a unit 1 comprises the housing or casing members 11 within which is disposed the cam barrel or cylinder 12, rotatable in bearings 13, 13, and having secured thereto at one end the gear 14 meshing with and driven by gear 15 through idler gear 15a in mesh with the pinion 16 secured upon the shaft 17 having secured thereto at one end thereof, exteriorly of the casing 11, a bevelled gear 17a meshing with and driven by bevelled gear 17b disposed concentrically with respect to the axis of movement of plunger 6. As indicated in Fig. 2, the gear 17b is in meshing engagement with the several bevelled gears 17a and is driven in any suitable manner from a source of power to rotate the cams 12 through the mechanism described, which source of power also drives the form block actuating mechanism, as a cam, of the type disclosed in said U. S. Letters Patent to Nitsch et al., for the members 9 and 10.

Figures 4, 6, 15, 16, 17:
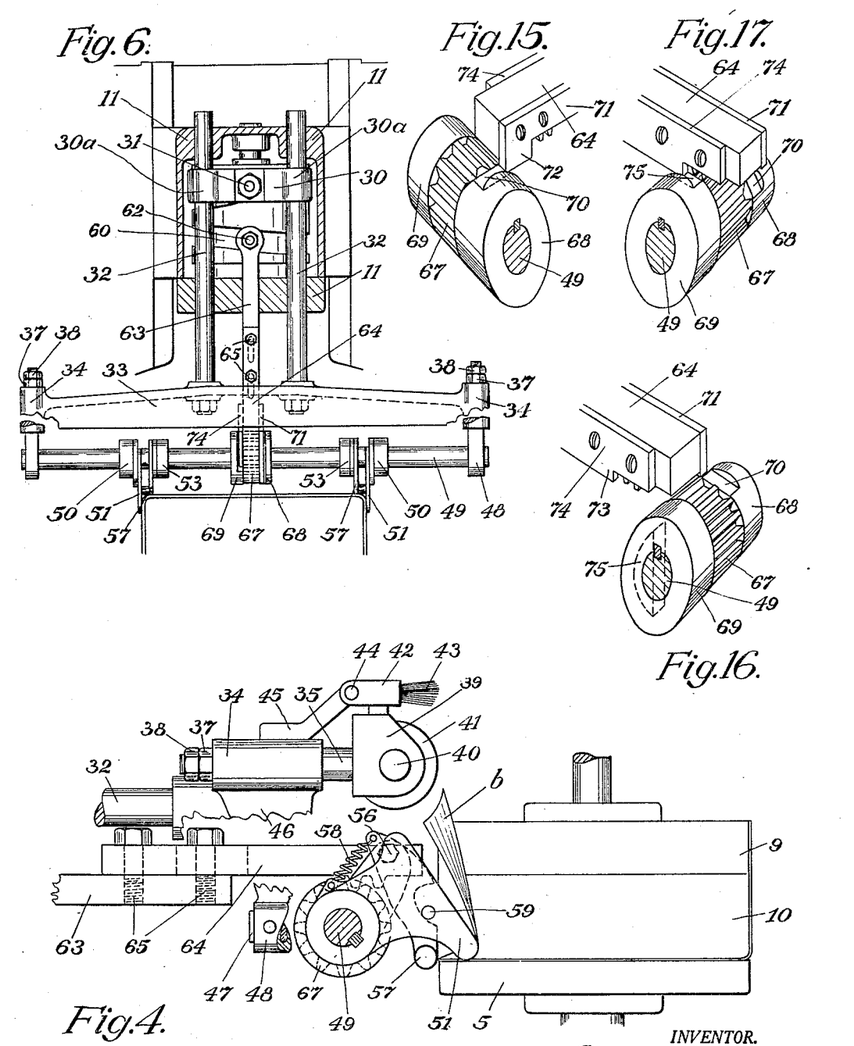
Fig. 4 is a side elevational view showing a corner lap folding tool while applying a corner lap section to a box wall and a wiping tool which cooperates therewith.
Fig. 6 is a plan view, partly in section, illustrating a pair of corner lap folding members, and wiping tools cooperating therewith, the upper roll and brush structure being omitted for the sake of clearness.
Figs. 15, 16 and 17 are fragmentary views of mechanism for controlling rotation of the shaft on which the corner lap folding tools are mounted.

The cam barrel 12 is provided with a circumferentially continous cam groove or slot 26 receiving the roller or cam follower 27 disposed upon the member or rod 28 comprising a sleeve portion 29 upon which rests a bracket 30 secured to said rod 28 in any suitable manner, as by a nut 31. As indicated in Fig. 6, bracket 30 comprises the oppositely extending perforated arms 30a, each receiving and being secured to a rod or member 32 mounted for free reciprocating movement in the slide plates 11, as viewed in Fig. 3. Carried by the rods 32 at their forward ends is a transversely extending supporting member 33 provided at its opposite ends with the bearing supports 34, within each of which is disposed a shaft 35 between a shoulder on which and an end of a recess or chamber in the support 34 is disposed the helical spring 36 which is maintained under suitable degree of compression by adjustments of the nut 37 threaded upon shaft 35, and locked by nuts 38. The spring 36 serves as a cushion resiliently opposing movement of its shaft 35 towards the left, Fig. 3. At its outward or forward end, each shaft 35 carries a bearing member 39 in which rotates a shaft 40 on which is mounted a roller 41 of any suitable material, either rigid or yielding. Carried by each member 33 is a bar 42 carrying the numerous brush units 43, said bar 42 being pivoted at 44 in the brackets 45 extending from member 33.

Extending downwardly as viewed in Fig. 1, from the members 33 at each end thereof are the arms 46, in a recess in each of which is secured, as viewed in Figs. 3 and 4, a horizontally extending rod 47 terminating in a bearing 48 for a transverse horizontally extending shaft 49, to which are splined or keyed the collars 50 carrying the corner lap folding members of flipper blades 51, said collars 50 being held in any desired position on shaft 49 by set screws 52. Also keyed or splined to the shaft 49 are collar members 53, held in an adjustable position longitudinally of the shaft by any suitable means, as by set screws 54, to each of which a plate 55 is attached, having pivoted thereto, as at 56, a wiping or holding member 57. A spring 58 connected at one end to the plate 55 and at its other end to an arm of the holding member 57 tends to effect counter-clockwise rotation of said member, as viewed in Fig. 7. The extent of movement of the member 57 under the influence of spring 58 is limited by an abutment or pin 59 projecting from the blade portion of the corner lap folding tool 51.

The shaft 49 is actuated in timed relation with movement of the form block structure of the wrapping machine, as for example, by mechanism immediately to be described. It is to be understood, however, that the shaft may be actuated by other means, as, for example, by contact between the form block structure and an abutment secured to shaft 49 as specifically described and claimed in my co-pending application Serial No. 221,201, filed September 22, 1927. Cam barrel 12 may be provided with a groove 60 receiving the roller or cam follower 61, from which rises a stud 62 secured to a bar 63 having adjustably affixed thereto by means of the bolts 65 a rack 66 adapted to mesh at its forward end with a gear 67 mounted on shaft 49. On each side of the gear 67 there are disposed collar members 68 and 69 keyed or otherwise securely fastened to shaft 49 and adapted to rotate therewith. The collar 68 is provided with a flat portion 70 which cooperates with a plate 71 affixed to the rack bar 64. Before and during initial forward movement of the rack bar 64, as viewed in Fig. 3, a nose portion 72 of the bar or plate 71 remains in engagement with flattened portion 70 or the collar 68 and prevents movement of shaft 49. After the rear end of the nose portion 72 has passed beyond the flat 70 the teeth of the rack member 64 engage the gear 67 and rotate the shaft 49 through a predetermined angle, whereupon a nose portion 73 of a plate 74 affixed to the rack bar 64 and oppositely disposed with respect to plate 71 engages a flattened section 75 of the collar 69 as the roller 61 reaches a dwell region of cam groove 60 and holds the shaft 49 and its associated mechanism from movement. Rotation of shaft 49 and therefore of the corner lap folding tools and associated mechanism is therefore at all times under the positive control of the rack bar 64.

Figure 5:
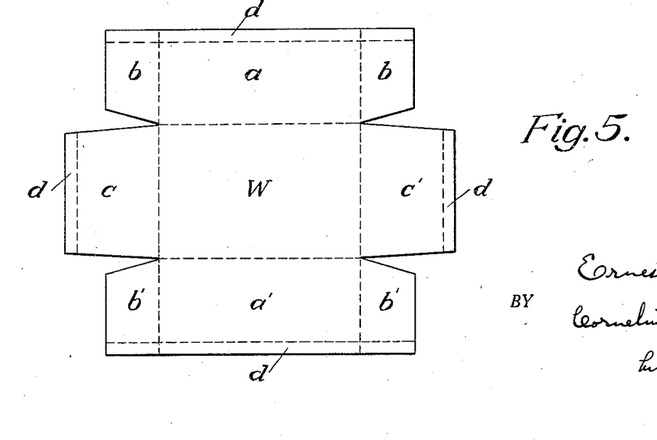
Fig. 5 is a plan view of a wrapper.
Figures 12, 13, 14:
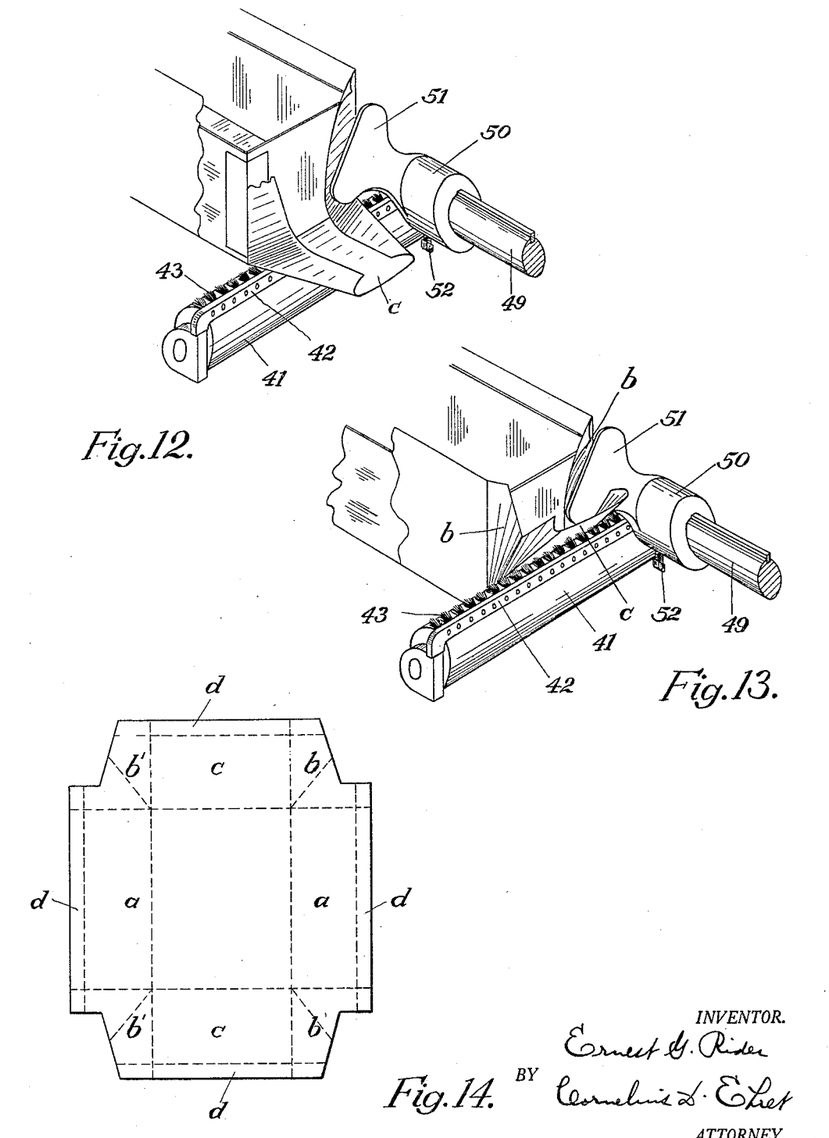
Figs. 12 and 13 are perspective views showing a corner lap folding tool applying a corner lap section of a wrapper to a loose wrapped box at different positions of the platen or form block.
Fig. 14 is a plan view of a loose wrapper.

The operation of the apparatus thus far described is as follows:

Initially, the box with a coated wrapper, either tabbed or untabbed may be manually placed upon the form block 9, 10, or automatically as by mechanism of the general character described in the application of Federwitz and Bailey, Serial No. 40,769, filed July 1, 1925, wherein boxes are individually fed beneath the wrapping machine form block structure in timed relation with arrival of the individual wrappers, either tabbed or otherwise. Regardless of what manner the boxes and wrappers are fed and associated one with the other, a box B with a coated wrapper W adhering to its bottom is moved by the form block structure 9, 10 into engagement with the upper surface of the lower form block or platen 5, which yields and descends in opposition to spring 8 as the blocks 9 and 10 descend. As shown in Fig. 1, the upper form block is actuated in the known manner more completely disclosed in the aforesaid Federwitz et al. Patent 1,541,036 from cam 101 through levers 102, 103 and 104, the last of which is connected to the rod structure 105 whose lower end supports the form block. As cam 101, and gear 17b driving cams 12 and 77 rotate together, the reciprocations of the form block and operation of the wrapping tools are in timed relation. During initial movement of plungers 9 and 10, the box and wrapper are forced downwardly past the brushes 43 and rollers 41 of the units 1, which have been advanced by their respective cam grooves 26 to positions causing the brushes to fold the side flap portions or panels $a$ and $a'$ of the wrapper, Figs. 5 and 14, upwardly into engagement with the sides of the box B, the descending box passing side rollers 41 immediately thereafter, whereupon said side panels are forced into contact with the respective box sides where they adhere because of the previous application of adhesive to the wrapper as a whole.

The corner lap folding operation occurs without any pause in the downward travel of the form block structure and the partially wrapped box. To this end, when the cam grooves 26 function to move rollers 41 and brushes 43 to the position aforesaid, and as the form block continues to move downwardly, the cam groove 60 advances the rack bar 64 from its fully retracted position as shown in Figs. 15 and 16, effecting engagement as above described between the teeth of the rack bar and those of gear 67 to effect movement of the corner lap folding tools 51 which have been previously adjusted so that the distance therebetween corresponds substantially with the external box length. The wiping or holding fingers 57 have been previously adjusted so that the distance therebetween is slightly less than the external box length, as shown in Fig. 6. As shaft 49, Fig. 3, partakes of clockwise rotative movement in the manner described above, tools 51 are similarly rotated and the blades thereof fold the now upstanding corner lap sections $b$, $b$, Figs. 8 to 11, into engagement with opposite box ends. Simultaneously therewith the spring tensioned holding or wiping member 57 is brought into engagement with the side wall of the box and holds the wrapper during the corner lap folding operation, resulting in a neat-appearing, smooth corner and at the same time because of movement of the box, pressing or wiping the wrapper into more intimate engagement with the box side wall. In the case of an unstayed box, Figs. 7 and 8, the member 57 presses the otherwise unsupported side wall of the box firmly against the form block while the corner lap section is being brought into adhesive engagement with the end wall of the box, resulting in an unstayed box having side and end walls at right angles to each other and to the box bottom. In a similar manner and concurrently, the shaft 49 and its associated corner lap folding tools and wiping or holding tools along the other side of the box function to fold the other pair of corner lap sections $b'$, $b'$ into engagement with opposite box ends from the other side of the box. Ordinarily by this operation, due to the shape of tools 51, the corner lap sections are ironed or wiped into intimate engagement with the respective box ends. Upon completion of the folding operation, as cam roller 61 has reached a dwell region of cam groove 60, the corner lap tools are held stationary with respect to the downwardly moving box and wrapper still further to insure, by a wiping action, intimate contact between the corner lap section and the end wall of the box. Upon continued movement of the form block structure beyond the folding tool, the cam 12 through cam slot 60 retracts the rack bar 64, effecting counter-clockwise rotation of shaft 49, as viewed in Fig. 3, removing the corner lap folding tools 51 from the path of the form block.

While the corner lap folding tools are rotated to press the wrapper section into engagement with the end of the box wall, as aforesaid, the end brushes 43 and end rolls 41 are advanced by cam slots 46 of units 2; these end brushes and rolls being disposed vertically below the corner lap folding tools or fingers 51, as indicated in Figs. 1, and 10 to 13. Immediately after or while the corner lap section of the wrapper is being applied to or wiped into engagement with the end wall of the box, the continued downward movement of the box and wrapper beyond the brushes 43 of units 2 forces the end flaps $c$, $c'$ of the wrapper against the end walls of the box and the turned-in corner-laps.

Figures 9, 10, 11:
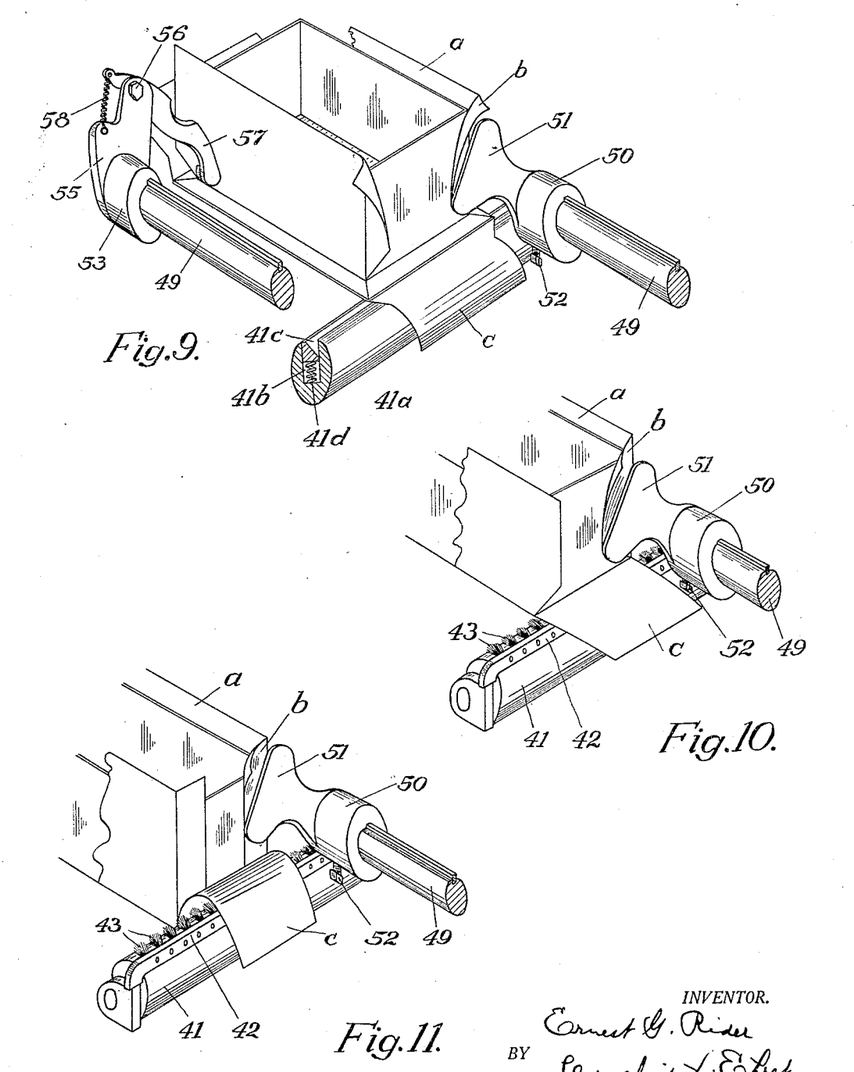
Fig. 9 is a perspective view showing a corner lap folding tool while applying a corner lap section to a wall of an extension bottom box.
Figs. 10 and 11 are perspective views disclosing a corner lap folding tool, applying a corner lap section of a wrapper to a tight wrapped box, for different positions of the form block.

When boxes of the extension bottom type are to be wrapped, the rollers 41 and the brushes 43 are replaced by a roller 41$a$ having a longitudinal slot 41$b$ therein, in which is disposed a bevelled element consisting of a longitudinal rod 41$c$ slidable transversely in slot 41$b$ and biased upwardly against the stop, not shown, by a spring 41$d$. The roller shown in Fig. 9 is of the type and operates in a manner similar to that of a like roller disclosed in U. S. Letters Patent to Morrison, No. 1,348,369. After or while the corner lap section of the wrapper is being applied to the end wall of the box, the descending extension flange of a special platen first enters the slot, as shown in Fig. 9, the roller being provided with a resilient mounting, tending to maintain it in the upward position shown in that figure. A slight descent of the wall rotates the roller 41$a$ until the upper slot wall contacts with the edge of the flange. Further descent of the box forces bevelled rod 41$c$ slightly inward, its inclined face, however, tending to keep the flange in constant yieldable contact with the upper wall, such descent effecting rotation of the roller 41$a$ to bring the periphery of the roller into continuous rolling contact with the end wall of the box, forcing the wrapper against the flange and end wall in an effective manner. It will be understood that prior to this operation the side panels of the wrapper have been in like manner pressed into engagement with the side walls of the box. Before or during the corner lap turn-in operation, the members 57 are engaged by the extension edge of the platen as the box descends, tensioning the spring 58. As the platen moves beyond engagement with the members, the latter, due to the springs 58, rotate to stretch the wrapper tightly over the extension flange, the remainder of the operation being as heretofore described with respect to boxes of the ordinary type.

The application of a loose wrapper to a box is similar to that described with respect to the application of a tight wrapper. The shaft 49 is rotated by movement of the rack bar 64 into meshing engagement with the gear 67, to rotate the corner lap tools 51 which press the turn-in sections $b$, $b'$ of the wrapper into adhesive engagement with the end wall of the box. Continued downward movement of the form block past the end rollers 41 and brushes 43, which have been advanced by the cams 12 of units 2, forces the end portions $c$, $c'$ of the loose wrapper into adhesive engagement with the end wall of the box.

Completion of the box wrapping operation in each of the above cases may be effected in any desired manner. As herein shown the structure for this purpose is of the character disclosed in the aforesaid Letters Patent to Nitsch et al., No. 1,540,900, and comprises the second cam or barrel 77 rotatable in bearings 78 and having the cam slots or grooves 79 and 80. Disposed in the cam groove 79 is the roller or cam follower 81, carried upon the pin of stub shaft 82, carried by the frame or support 83 movable, preferably in a rectilinear path parallel to the axis of rotation of the cam barrel 77 upon guide ways on the casing 11. Carried upon the forward end of the frame 83 is the transversely extending bar or support to which is secured clamping member 85, between which and the member 84 is clamped the turn-in finger or plate 86.

In the cam slot 80 is disposed the roller or cam follower 87 carried by a pin or stub shaft 88 carried by the support or frame 89, movable preferably in a rectilinear path parallel to the axis of rotation of the cam barrel 77 upon slides or guide ways of the casing 11. At its forward end, the frame 89 is provided with holes in which are supported and longitudinally movable the pins 90 secured to and supporting transversely extending bar 91 upon the frame 89. The bar is recessed, as indicated in Fig. 3, and in the recess is disposed the presser bar or block 92 held in a desired position by the clamping screws 93. The presser bar 92 has upon its front end a pad 94 of felt or other suitable material.

Referring to Fig. 1, the slides or slide units 2, for applying the wrapper end panels $c$ and $c'$ to the ends of the box, are in general similar to the units 1 hereinbefore described. Each comprises cam barrels or cylinders 12 and 77, not shown, having bearings in the housing or casing 11 and driven from a shaft 17 having a bevelled gear 17$a$ secured thereto and in meshing engagement with the bevelled gear 17$b$.

The cam barrels, not shown, in the slide unit 2, are provided with slots or grooves with which coact, respectively, the rollers or cam followers for actuating and controlling, respectively, the frames or members 33, 83 and 89.

As with the units 1, the frame 33 carries the brushes 43 and roller 41; the frame 83 carries the turn-in fingers; and the frame 89 carries the presser block 92.

Upon completion of the corner lap folding operation described above, the partially wrapped box under the control of the form block structure continues its downward movement without pause, and in so doing the lower sets of brushes 43, which meanwhile have been advanced by the cam barrels of the respective units 2, fold the end panels $c$ and $c'$ of the wrapper upwardly into engagement with the respective ends of the box, the descending box thereupon passing the now advanced lower side rollers 41 which force the end panels into intimate contact with the box ends.

This operation is effected without pause in the downward travel of the partially wrapped box, continued movement thereof occurring until the upper horizontal surfaces of the box sides and ends are positioned just below the turn-in fingers 86. At this time, downward movement of the partially wrapped box temporarily ceases, whereupon the cams 77 in the units 1 and the cams, not shown, in the units 2, function to simultaneously advance said turn-in fingers above the horizontal surfaces of the box sides and ends to fold all of the now vertical wrapper turn-in sections $d$, Fig. 5. into horizontal position, this operation being possible because the upper form block 10 has previously separated from the intermediate form block 9, and is held in a suspended position by mechanism, not shown, but well understood in the art. Upon completion of inward movement of the turn-in fingers 86 aforesaid, the upper form block 10 descends and is now supported solely upon the upper surface of said turn-in fingers. During inward movement of turn-in fingers 86, as described above, cams 77 in the units 1 and the cams, not shown, in units 2, function to advance the presser blocks 92 into engagement with the exterior surfaces of the box sides and ends for applying thereto light pressure, whereby the box is steadied during the turn-in action.

As soon as the various turn-in fingers 86 have been moved inwardly to their full extent, they are immediately retracted by the various cams, with the result that the upper form block 10 drops as a dead weight into the upper part of the box and onto the middle form block 9, carrying the now horizontal turn-in sections $d$ of the wrapper downwardly into intimate engagement with the inside surface of the box walls and ends.

Thereafter, slight retractive movement of presser blocks 92 is effected by the cam 77 in units 1 and the cams, not shown, in units 2, whereupon the combined form block structure carries the box with the wrapper adhering thereto a slight distance downwardly, whereupon the cams aforesaid again advance the presser blocks 92 into engagement with the respective box sides and ends for exerting substantial pressure thereon, this action of course being resisted by the intermediate and upper form blocks 9 and 10.

The wrapper application is now completed, and the wrapped box now ascends without pause, the various presser blocks, turn-fingers, rolls, brushes, corner lap finger members, etc., meanwhile having been retracted from the path of the form block structure by the various cams. During upward passage of the wrapped box, as aforesaid, suitable mechanism strips the same from the intermediate and upper form block structure 9 and 10 after the latter have separated from the lower form block or platen 5.

It is to be understood that in one of its broad aspects my invention is concerned with either or both holding and smoothing a wrapper section to a wall of a box, and in some cases simultaneously supporting the wall, while another portion of the same wrapper section is being applied to another adjacent portion of the box.

What I claim as my invention is:

1. In a wrapping machine or the like, means for folding a wrapper panel into engagement with a box side wall, a support, a shaft rotatably mounted thereon, a plurality of turn-in tools carried by said shaft, and means to effect, positively, rotation of said shaft in both directions of movement.

2. In a wrapping machine or the like, means for effecting engagement of a wrapper panel and a box side wall, a support, a shaft mounted thereon, a plurality of turn-in tools carried by said shaft to fold corner-lap sections of the panel into engagement with the box ends, and a plurality of members carried by said shaft to wipe the panel adjacent said corner-lap sections into intimate engagement with the box side wall during operation of the turn-in tool.

3. In a wrapping machine or the like, the combination with a support, of a unit adjustable to different positions thereon for operation upon boxes of different dimensions, said unit comprising cam structure, a supporting member controlled by said cam structure, wrapper side panel folding structure carried by said member, and structure for folding wrapper turn-in sections into engagement with box ends likewise carried by said member.

4. In a wrapping machine or the like, the combination with a support, of a unit adjustable to different positions thereon for operation upon boxes of different dimensions, said unit comprising cam structure, a supporting member controlled by said cam structure, wrapper side panel folding structure carried by said member, and rotary structure for folding wrapper turn-in sections into engagement with box ends likewise carried by said member.

5. In a wrapping machine or the like, means for effecting the engagement of a wrapper panel and a box side wall, a support, a shaft mounted thereon, a plurality of turn-in tools carried by said shaft to fold corner-lap sections of the panel into engagement with the box ends, and a plurality of members, each having a yielding finger adapted to engage the wrapper panel, carried by said shaft to wipe the panel into intimate engagement with the box side wall during the operation of the turn-in tool.

6. In a wrapping machine or the like, means for effecting the engagement of a wrapper panel and a box side wall, a support, a shaft mounted thereon, a plurality of turn-in tools carried by said shaft to fold corner-lap sections of the panel into engagement with the box ends, and a plurality of members, each having a spring-biased finger adapted to engage yieldingly the wrapper panel, carried by said shaft to wipe the panel into intimate engagement with the box side wall during the operation of the turn-in tool.

7. In the art of applying wrappers to boxes, the method which comprises passing a box and an adhesive-coated wrapper along a path, moving a folding tool linearly in a path intercepting the path of movement of the box and wrapper to engage the leading portion of a wrapper section, and substantially at the time of engagement with said portion, imparting to the tool an additional component of motion in the direction of movement of the box.

8. Mechanism for applying wrappers to boxes comprising means for passing a box and wrapper along a path, a folding tool, reciprocating supporting structure therefor actuated in timed relation to said means to move said tool into the path of movement of said box and wrapper, and means to impart to said tool while in engagement with a wrapper portion motion having a component in the direction of movement of said box.

9. Mechanism for applying wrappers to boxes comprising means for passing a box and wrapper along a path, a folding tool, supporting structure therefor actuated in timed relation to said means to move said tool into the path of movement of said box and wrapper, and means comprising a cam to impart to said tool while in engagement with a wrapper portion motion having a component in the direction of movement of said box.

10. Mechanism for applying wrappers to boxes comprising means for passing a box and a corner-notched wrapper along a path, a folding tool, supporting structure therefor actuated in timed relation to said means to move said tool into the path of movement of said box and wrapper, and means to impart to said tool while in engagement with a corner lap of said wrapper, positive motion having a component in the direction of movement of said box.

11. Mechanism for applying wrappers to boxes comprising means for passing a box and wrapper along a path, means to fold a wrapper portion into engagement with a box wall comprising a tool movable in engagement with said portion transversely of and in the direction of movement of the box, and cam structure operating in timed relation to said first means effecting positive movement of said folding means.

12. Mechanism for applying wrappers to boxes comprising form block structure for passing a box and wrapper along a path, and means operating in timed relation to said form block to fold a wrapper portion into engagement with a box wall comprising a positively actuated member first movable in engagement with said portion transversely of and in the direction of movement of the box and wrapper, and thereafter stationary in engagement with said portion during further movement of the box.

13. In a wrapping machine or the like, means for effecting engagement of a wrapper panel and a box side wall, a support, a shaft mounted thereon, a plurality of turn-in tools carried by said shaft to fold corner lap sections of the panel into engagement with the box ends, and a plurality of tools carried by said shaft to engage the panel adjacent the corner lap sections.

14. Mechanism for applying wrappers to boxes comprising reciprocating form block structure, wrapper folding structure, means moving said folding mechanism toward and away from the path of movement of said form block structure, and means effecting movement of said folding structure in the direction of movement of said form block structure when adjacent the path thereof.

15. A box-wrapping machine comprising reciprocating form block structure, wrapper folding structure, cam mechanism moving said folding mechanism toward and away from the path of movement of said form block structure, and cam mechanism effecting movement of said folding structure in the direction of movement of said form block structure during a wrapper turn-in operation.

16. In the art of applying wrappers to boxes, the method which comprises passing along a path a box and an adhesive coated wrapper corner-cut to form corner-lap sections, moving a folding tool linearly in a path intercepting the path of movement of the box and wrapper to engage the leading edge of a corner-lap section, substantially at the time of engagement with said edge imparting to the tool an additional component of motion in the direction of movement of the box, and thereafter holding said tool stationary during continued movement of the box progressively to fold the trailing portion of the corner-lap section.

17. In the art of applying wrappers to boxes, the method which comprises passing along a path a box and an adhesive coated wrapper corner-cut to form corner-lap sections, moving a folding tool linearly in a path intercepting the path of movement of the box and wrapper to engage the leading edge of a corner-lap section, substantially at the time of engagement with said edge imparting to the tool and additional component of motion in the direction of movement of the box, thereafter holding said tool stationary during continued movement of the box progressively to fold the trailing portion of the corner-lap section, and before said box moves out of engagement with said tool folding another wrapper portion into engagement with the folded corner-lap section.

18. In the art of applying wrappers to boxes, the method which comprises passing along a path a box and an adhesive coated wrapper corner-cut to form corner-lap sections, simultaneously moving folding tools toward each other linearly in a path intercepting the path of movement of the box and wrapper to engage the leading edge of a corner-lap section, substantially at the time of engagement with said edges, simultaneously imparting to said tools an additional component of motion in the direction of movement of the box, and thereafter holding said tools stationary during continued movement of the box progressively to fold the trailing portions of the corner-lap sections toward each other and into engagement with the box.

19. In the art of applying wrappers to boxes, the method which comprises passing along a path a box and an adhesive coated wrapper corner-cut to form corner-lap sections, simultaneously moving folding tools toward each other linearly in a path intercepting the path of movement of the box and wrapper to engage the leading edge of a corner-lap section, substantially at the time of engagement with said edges, simultaneously imparting to said tools an additional component of motion in the direction of movement of the box, therafter holding said tools stationary during continued movement of the box progressively to fold the trailing portions of the corner-lap sections toward each other and into engagement with the box, and before said box moves out of engagement with said tools folding another wrapper portion into engagement with the folded corner-lap sections.

ERNEST G. RIDER.